(12) United States Patent
Papenfuhs et al.

(10) Patent No.: US 7,312,275 B2
(45) Date of Patent: Dec. 25, 2007

(54) CROSS-LINKED POLYVINYL ACETALS

(75) Inventors: Bernd Papenfuhs, Obertshausen (DE);
Martin Steuer, Liederbach (DE);
Simon Jonas, Hattersheim (DE)

(73) Assignee: Kuraray Specialities Europe GmbH,
Frankfurt Am Main (DE)

( * ) Notice: Subject to any disclaimer, the term of this patent is extended or adjusted under 35 U.S.C. 154(b) by 0 days.

(21) Appl. No.: 10/519,133

(22) PCT Filed: Jul. 1, 2003

(86) PCT No.: PCT/EP03/06973

§ 371 (c)(1),
(2), (4) Date: Mar. 10, 2005

(87) PCT Pub. No.: WO2004/005358

PCT Pub. Date: Jan. 15, 2004

(65) Prior Publication Data

US 2005/0239960 A1    Oct. 27, 2005

(30) Foreign Application Priority Data

Jul. 4, 2002  (DE) ............... 102 30 251
Apr. 29, 2003 (DE) ............... 103 19 198

(51) Int. Cl.
*C08F 8/00*    (2006.01)
*C08G 64/14*   (2006.01)

(52) U.S. Cl. .................... 525/61; 525/56; 525/62

(58) Field of Classification Search ............... 525/56, 525/62; 526/62, 61
See application file for complete search history.

(56) References Cited

U.S. PATENT DOCUMENTS

| 2,332,899 | A  | * | 10/1943 | D Alelio ............ 525/60 |
| 2,882,161 | A  |   | 4/1959  | Dann et al. |
| 3,577,374 | A  | * | 5/1971  | Isaksen et al. ............ 523/177 |
| 6,808,858 | B2 | * | 10/2004 | Fuss et al. ............ 430/157 |

FOREIGN PATENT DOCUMENTS

| EP | 0 174 479     | 3/1986  |
| EP | 1 180 528 A1  | 2/2002  |
| EP | 1 180 529 A1  | 2/2002  |
| WO | WO 01/79305 A2| 10/2001 |

* cited by examiner

*Primary Examiner*—David W. Wu
*Assistant Examiner*—M. Bernshteyn
(74) *Attorney, Agent, or Firm*—Hamilton, Brook, Smith & Reynolds, P.C.

(57) ABSTRACT

The invention relates to a cross-linked polyvinyl acetal which is characterized in that it can be obtained from at least one polyvinylacetal (1) which is obtained by reacting at least one polymer (A), which contains a) 1,0 to 99.9 wt. % structural units of formula (1), b.) 0 to 99.0 wt. % structural units of formula (2), c.) 0 to 70.0 wt. % structural formula (3), d.) 0.0001 to 30.0 wt. % structural units of formula (4) respectively in relation to the overall weight of the polymer (A), with at least one compound (B) of formula (5). Furthermore, the present invention relates to methods for the production of the polyvinyl acetal according to the invention as well as its use.

17 Claims, No Drawings

CROSS-LINKED POLYVINYL ACETALS

RELATED APPLICATIONS

This application is the U.S. National Stage of International Application No. PCT/EP2003/006973, which was filed 1 Jul. 2003, was published in German, and claims priority under 35 U.S.C. § 119 or 365 to German Application No. 102 30 251.0, filed on 4 Jul. 2002, and German Application No. 103 19 198.4, filed on 29 Apr. 2003.

The present invention relates to new crosslinked polyvinyl acetals, a method for their production and their use.

It is known to process polyvinyl acetals, in particular polyvinyl butyrals, together with softeners by means of extrusion into films, which in particular are used in laminated safety glasses.

In order to increase the molecular weight of such polyvinyl butyrals, it is proposed in EP-A-0 211 818 to crosslink them by means of stable intermolecular diacetal linkages. The crosslinking takes place by means of aldehydes with at least two aldehyde groups. The crosslinking agent is added before or during the acetalisation of the polyvinyl alcohols with butyraldehyde.

Due to the high reactivity of the aldehydes, however, the crosslinking of polyvinyl butyrals with dialdehydes leads to strongly crosslinked, very high-molecular and thus partially insoluble polyvinyl butyrals. Moreover, the crosslinking reaction can only be controlled with difficulty on account of the low selectivity, as a result of which the production of reproducible product qualities is very difficult.

It is proposed in DE-A-100 18 517 to use diesters, in particular of oxalic acid, for the crosslinking of polyvinyl butyrals. It is thus possible to produce high-molecular products with very good reproducibility. A drawback, however, is the requirement that the crosslinking agent has to be added as an additive prior to the film extrusion. On account of the two-phase nature of the system, this results in homogenisation problems, which necessitate efficient pre-mixing as an additional process step. Furthermore, the need for the addition of a crosslinking agent means a possible source of error for the film manufacturer, since weighing and metering errors can never be completely eliminated. A further drawback is the liberation of low-molecular alcohols arising during the transesterification, which can lead in some circumstances to higher operational safety requirements.

It is further known to crosslink polyvinyl butyrals in coating applications by means of crosslinking agents, the functional groups whereof can enter into chemical bonds with the OH groups of the polyvinyl butyral. Examples of such crosslinking agents are phenol formaldehyde resins, polyfunctional aldehydes, polyfunctional epoxides, epoxy resins, melamine resins and polyfunctional isocyanates. A summary of compounds that can be used for the crosslinking of polyvinyl butyrals is given for example in the product brochure "Mowital", issue August 1997, from Clariant GmbH. The need for the addition of a crosslinking agent is also a drawback here. It is also a drawback that polyvinyl butyral is not compatible with all crosslinking agents, as a result of which its possible applications are limited.

It is described in unpublished DE 10143190 that polyvinyl butyrals containing small quantities of coacetalised, acid-functionalised aldehydes can be thermally crosslinked without the addition of separate crosslinking agents being required.

A drawback with these self-crosslinking polymers, however, is that a further constituent has to be added for their production (possibility of weighing and/or metering errors). In addition, the preferred acid-functionalised aldehydes are relatively costly compared with butyraldehyde and exhibit a greatly reduced reactivity. This necessarily gives rise to worse space/time yields (longer boiler occupancy times), higher energy costs and greater environmental and sewage-treatment plant load (higher CSB values of the waste water mean higher levies on the sewage-treatment plant operators).

The problem underlying the present invention, therefore, is to make available preferably high-molecular polyvinyl acetals, in particular polyvinyl butyrals, which can be produced with high reproducibility and without the addition of a separate crosslinking agent or further acetalisation constituents and which is outstandingly well suited for the production of products such as, for example, films and coatings, in particular laminated glass panes. The polyvinyl acetals according to the invention should not have the drawbacks described above.

It has been found that polyvinyl acetals, in particular polyvinyl butyrals, which contain carboxyl groups bound directly to the polymer chain (backbone), can be thermally crosslinked at relatively low temperatures. This result is very surprising, inasmuch as the polymer chains for the esterification reaction leading to the crosslinking must come spatially very close to one another, and this is subject to a marked steric hindrance on account of the high space requirement of the ring-shaped acetal fragments.

The subject-matter of the present invention, therefore, is a crosslinked polyvinyl acetal, which can be obtained from at least one polyvinyl acetal (1), which can be obtained by reacting at least one polymer (A), which contains a) 1.0 to 99.9 wt % structural units of formula (1)

b) 0 to 99.0 wt. % structural units of formula (2)

c) 0 to 70.0 wt. % structural units of formula (3)

d) 0.1 to 30.0 wt. % structural units of formula (4)

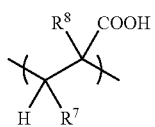
(4)

related in each case to the total weight of polymer (A), with at least one compound (B) of formula (5),

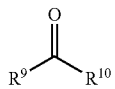
(5)

whereby groups of formula (1) and of formula (4) are, at least in part, esterified with one another.

The respective structural units naturally differ from one another, in particular the structural unit of the general formula (3) does not include the structural units of the general formulas (1), (2) and/or (4).

Radical $R^1$ represents, in each case independently of one another, hydrogen or methyl, preferably hydrogen.

Radical $R^2$ denotes hydrogen or an alkyl radical with 1 to 6 carbon atoms, preferably an alkyl radical with 1 to 6 carbon atoms, expediently a methyl, ethyl, n-propyl, iso-propyl, n-butyl, sec-butyl, tert-butyl, n-pentyl or an n-hexyl group, preferably a methyl or an ethyl group, in particular a methyl group.

Radicals $R^3$, $R^4$, $R^5$ and $R^6$ are, in each case independently of one another, radicals with a molecular weight in the range from 1 to 500 g/mol, expediently hydrogen, an optionally branched, aliphatic or cycloaliphatic radical with 1 to 16 carbon atoms, which can optionally contain one or more carboxylic acid ester groups, carboxylic acid amide groups and/or sulphonic acid groups.

Particularly preferred structural units of formula (3) are derived from straight-chain or branched olefins with 2 to 18 carbon atoms, (meth)acrylamides and/or ethylene sulphonic acid. Olefins, especially those with a terminal C-C double bond, which preferably have 2 to 6 carbon atoms, in particular ethylene, have been shown to be very particularly favourable. Furthermore, structural units (3) which are derived from acrylamidopropenyl sulphonic acid (AMPS) also lead according to the invention to results that are very particularly advantageous.

Radical $R^7$ is hydrogen, a carboxyl group (COOH) or an alkyl group with 1 to 10 carbon atoms, expediently hydrogen or a methyl, ethyl, n-propyl, iso-propyl, n-butyl, sec-butyl, tert-butyl, n-pentyl or an n-hexyl group, which can optionally have one or more COOH groups as a substituent.

Radical $R^8$ denotes hydrogen, a carboxyl group or an alkyl group with 1 to 10 carbon atoms, expediently hydrogen or a methyl, ethyl, n-propyl, iso-propyl, n-butyl, sec-butyl, tert-butyl, n-pentyl or an n-hexyl group, which can optionally have one or more COOH groups as a substituent. Particularly preferred radicals $R^8$ include hydrogen, a methyl group and —$CH_2COOH$.

Radicals $R^9$ and $R^{10}$ are, in each case independently of one another, hydrogen, COOH, an alkyl group with 1 to 10 carbon atoms and an aryl group with 6 to 12 carbon atoms.

These alkyl and aryl radicals can be replaced by one or more carboxyl groups, hydroxyl groups, sulphonic-acid groups and/or halogen atoms, such as fluorine, chlorine, bromine, iodine. Preferred compounds (B) include formaldehyde, acetaldehyde, propionaldehyde, n-butyraldehyde, iso-butyraldehyde, 2-ethoxybutyraldehyde, paraldehyde, 1,3,5-trioxane, capronaldehyde, 2-ethylhexanal, pelargonaldehyde, 3,5,5-trimethylhexanal, 2-formyl-benzoic-sulphonic acid, acetone, ethylmethylketone, butylethylketone and/or ethylhexylketone. According to a further preferred form of embodiment, glyoxylic acid HCO—COOH is used as compound (B).

Within the scope of the invention, the use of aldehydes, i.e. of compounds of formula (5) with $R^9$=hydrogen and $R^{10}$=hydrogen, a methyl, ethyl, n-propyl or an iso-propyl group, preferably of formaldehyde and/or n-butyraldehyde, especially of n-butyraldehyde, has very particularly proved useful.

The total number of structural units of formula (2) is preferably in the range from 0.01 to 40 mol %, expediently in the range from 0.1 to 25.0 mol %, especially in the range from 0.5 to 15.0 mol %, in each case related to the total number of structural units of formulas (1) and (2). According to a preferred form of embodiment of the present invention, use is made of a polymer (A) which contains, related to the total number of structural units of formulas (1) and (2), 0.5 to 2.5 mol % structural units of formula (2).

Within the scope of the present invention, polymer (A) can have a syndiotactic, isotactic and/or atactic chain structure. Furthermore, it may be present both as a random as well as a block copolymer.

According to the invention, the viscosity of polymer (A) is of secondary importance; in principle, both low-molecular as well as high-molecular polymers (A) can be used. Within the scope of the invention, however, it has proved to be very particularly favourable for polymer (A) to have a viscosity in the range from 1 to 70 mPas, preferably in the range from 2 to 40 mPas, expediently in the range from 2.5 to 35 mPas, in particular in the range from 3 to 30 mPas (measured as a 4 wt. % aqueous solution according to Höppler at 20° C., DIN 53015).

The production of these polyvinyl acetals (I) used as raw materials is known and is described for example in DE 10011096 for other applications.

The crosslinked polyvinyl acetals according to the invention therefore have the following structural unit:

P—O—C(O)—P' in which P and P' represent identical or different polyvinyl acetal fragments, which can contain further bound carboxylic-acid groups.

As starting materials, use can be made of all polyvinyl acetals (I) known to the expert that contain carboxyl groups bound directly to the polymer chain. The carboxyl group-containing polyvinyl alcohols used for their synthesis are products available in commercial quantities, which are produced as a rule by copolymerisation of vinyl esters with olefinically unsaturated carboxylic acids or their derivatives (e.g. acrylic acid, methacrylic acid, maleic acid, fumaric acid, crotonic acid, itaconic acid) and subsequent saponification.

They are not restricted in any way as regards their molecular weight, but preferably polyvinyl alcohols with a molecular weight of at least 20,000 g/mol are used.

The content of carboxyl groups, related to the polymer to be crosslinked, preferably lies in the range from 0.001 to 30.0 wt. %, particularly preferably in the range from 0.001 to 5.0 wt. % and in particular in the range from 0.01 to 2.0 wt. %.

The reaction of the initial compounds (A) and (B) preferably takes place in at least one inert solvent, whereby the term "inert solvent" stands for solvents which are such that, under the given reaction conditions, they do not disturb or even hinder the course of the desired reaction. A particularly expedient solvent in this connection is water. Furthermore, the reaction is preferably carried out in the presence of acid catalysts. Suitable acids include both organic acids, such as for example acetic acid, as well as mineral acids, such as hydrochloric acid, sulphuric acid and/or nitric acid, whereby the use of hydrochloric acid, sulphuric acid and/or nitric acid has proved particularly useful in practice. The performance of the reaction preferably takes place in such a way that constituents (A) are first put in aqueous solution, compound (B) is introduced into this solution and then the acid catalyst is added drop by drop.

The reaction temperature can be varied over a wide range, but the temperature often lies in the range from −20.0° C. to 100.0° C., preferably in the range from 0.0° C. to 80.0° C. The same applies to the pressure at which the reaction is conducted. The reaction can thus take place both at under-pressure and as well as at overpressure. Preferably, however, it will be carried out at normal pressure. Although the reaction can also take place under air, it has proved advantageous within the scope of the present invention to conduct the reaction under a protective gas atmosphere, preferably nitrogen and/or argon.

In a preferred form of embodiment, the crosslinked polyvinyl acetals according to the invention contain plasticiser. All plasticisers known to the expert can be used as a plasticiser. The plasticiser is used in standard quantities which are known to the expert. Known plasticisers for polyvinyl acetals, in particular for polyvinyl butyrals, are the esters of aliphatic monocarboxylic and dicarboxylic acids with mono- or multi-valent alcohols or oligoalkylene-glycoethers, phosphoric acid esters as well as various phthalates, such as are disclosed for example in U.S. Pat. No. 5,137,954. Use is preferably made, however, of diesters of di-, tri- and tetra-ethylene glycols with aliphatic monocarboxylic acids, adipic acid dialkylesters as well as the dibenzoates of alkylene and polyalkylene glycols described in DE-A-101 00 681 not previously published.

The subject-matter of the present application is also a method for the production of the polyvinyl acetals according to the invention, which is characterised in that at least one polyvinyl acetal (I), optionally together with at least one plasticiser, is thermally crosslinked at compound temperatures in the range from 120 to 280° C., preferably in the range from 140 to 260° C.

The thermal crosslinking of the polyvinyl acetal (I) can be carried out with all heatable units known to the expert, such as for example furnaces, kneaders, extruders, presses or autoclaves. The thermal crosslinking preferably takes place, however, in extruders or in kneading units, since these guarantee good homogenisation with the plasticiser(s), which is (are) contained in a preferred form of embodiment. The crosslinking can be recognised by the higher molecular weight of the crosslinked polyvinyl acetal compared with the non-crosslinked polyvinyl acetal (I).

The degree of crosslinking can—depending on the application—be freely selected. Within the scope of the present invention, however, it has proved very particularly expedient for at least 10 mol %, preferably at least 20 mol %, expediently at least 30 mol %, in particular at least 40 mol %, of all the carboxyl groups originally contained in the polyvinyl acetal (I) to be esterified.

The polyvinyl acetals according to the invention can be produced in any shape by means of the preferred extrusion. The subject-matter of the present application, therefore, is also shaped bodies containing the polyvinyl acetals according to the invention, preferably the polyvinyl butyrals according to the invention. Direct processing into films, with the aid of slot dies, is however preferred. Films are thus a preferred subject-matter of the present invention. Methods for the production of polyvinyl acetal films, in particular of polyvinyl butyral films, are sufficiently well known to the expert.

The films according to the invention can contain further standard admixtures, such as for example oxidation stabilisers, UV stabilisers, dyestuffs, fillers, pigments and/or anti-adhesion agents.

Laminated safety glasses can be produced according to methods known to the expert from the films according to the invention containing the crosslinked polyvinyl acetals.

A further subject-matter of the present invention, therefore, is the use of the films according to the invention in laminated safety glasses.

Furthermore, the preferably high-molecular, crosslinked polyvinyl acetals according to the invention find application in coatings of substrates.

The coatings can be applied onto the most varied substrates, such as for example wood, metal, plastic, glass, textiles, paper, leather as well as ceramic and mineral substrates.

The subject-matter of the present invention, therefore, is also coatings containing the preferably high-molecular, crosslinked polyvinyl acetals according to the invention.

The coatings can for example contain, as further constituents, further polymer resins, plasticisers, pigments, fillers, stabilisers, adhesion improvers, rheological processing aids, additives influencing the pH value and additives that catalyse chemical reactions both between the preferably high-molecular polyvinyl acetal according to the invention and other polymer resins as well as between the other polymer resins with one another.

The application of the coating can take place both as powder, which is then fused at raised temperature and crosslinked, as well as from organic solution by means of coating methods known to the expert. In the case of application from solution, the non-crosslinked carboxyl group-containing polyvinyl acetal (I), optionally together with other binding agents, such as for example plasticisers, pigments, fillers, stabilisers, adhesion improvers, Theological processing aids, is dissolved in the solvent or solvent mixture and then applied onto the substrate to be coated. The crosslinking takes place after evaporation of the solvent. The crosslinking of the coating preferably takes place in a temperature range between 120 and 280° C., in particular in the temperature range from 140 to 260° C. The crosslinking reaction can generally be assisted by additives lowering the pH value, such as for example organic and/or inorganic acids.

In the case of application in coatings, the crosslinking becomes apparent in an increase in the solvent-resistance of the coating as well as an increase in the molecular weight compared with the non-crosslinked polyvinyl acetal (I).

According to a further aspect of the present invention, the polyvinyl acetals according to the invention are also particularly well suited for the production of ion-conductive interlayers for electrochromic systems.

Within the scope of a preferred form of embodiment of the present invention, the crosslinked polyvinyl acetal according to the invention is used together with another polyvinyl acetal, which has a weight mean of the molecular weight of less than 10,000,000 g/mol, preferably less than 5,000,000 g/mol, expediently less than 1,000,000 g/mol, preferably less than 500,000 g/mol, in particular less than 250,000 g/mol. In this way, the processing properties of the crosslinked polyvinyl acetal according to the invention can, in particular, be markedly improved, especially during extrusion. The methods for determining the weight mean of the molecular weight of the polyvinyl acetal are known to the expert. It can take place for example by means of static light scatter or gel permeation chromatography in a suitable solvent. Alternatively, its determination can also take place proceeding from the corresponding polyvinyl alcohol by means of static light scatter or gel permeation chromatography in a suitable solvent.

Polyvinyl acetals that are particularly expedient in this connection can be obtained by reacting at least one polymer (A') with at least one compound (B'). Polymer (A'), in each case related to its total weight, includes a) 1.0 to 99.9 wt. % structure of units of formula (1)

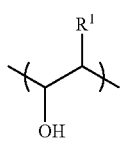

(1)

b) 0 to 99.0 wt. % structural units of formula (2)

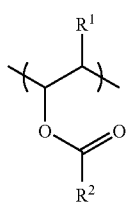

(2)

c) 0 to 70.0 wt. % structural units of formula (3)

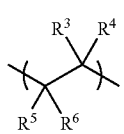

(3)

wherein $R^3$, $R^4$, $R^5$ and $R^6$, in each case independently of one another, are radicals with a molecular weight in the range from 1 to 500 g/mol, d) less than 0.1 wt. %, preferably less than 0.01 wt. %, expediently less than 0.001 wt. %, in particular no structural units of the formal (4).

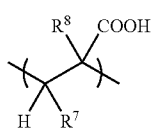

(4)

Radicals $R^1$ to $R^8$ are defined as described above in connection with polymer (A) and the particularly preferred forms of embodiment correspond to those forms of embodiment mentioned in connection with polymer (A), whereby the radicals can be selected in each case independently of one another for polymers (A) and (A').

Compound (B') satisfies formula (5)

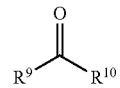

(5)

whereby radicals $R^9$ and $R^{10}$ are defined as described above in connection with compound (B) and the particularly preferred forms of embodiment correspond to those forms of embodiment mentioned in connection with compound (B), whereby the radicals can however be selected in each case independently of one another for the compound (B) and (B').

The total number of structural units of formula (2) in polymer (A') is preferably in the range from 0.01 to 40 mol %, expediently in the range from 0.1 to 25.0 mol %, in particular in the range from 0.5 to 15.0 mol %, in each case related to the total number of structural units of formulas (1) and (2). According to a preferred form of embodiment of the present invention, a polymer (A') is used which, related to the total number of structural units of formulas (1) and (2), contains 0.5 to 2.5 mol % structural units of formula (2).

Within the scope of the present invention, polymer (A') can have a syndiotactic, isotactic and/or atactic chain structure. Furthermore, it may be present both as a random as well as a block copolymer.

According to the invention, the viscosity of polymer (A') is of secondary importance; in principle, both low-molecular as well as high-molecular polymers (A') can be used. However, it has proved to be very particularly favourable within the scope of the present invention for polymer (A') to have a viscosity in the range from 1 to 70 mPas, preferably in the range from 2 to 40 mPas, expediently in the range from 2.5 to 35 mPas, in particular in the range from 3 to 30 mPas (measured as a 4 wt. % aqueous solution according to Höppler at 20° C., DIN 53015).

The production of these polyvinyl acetals used as raw materials is known and is described for example in DE 10011096 for other applications.

The mixing ratio of the self-crosslinking polyvinyl acetal according to the invention and the polyvinyl acetal with a weight mean of the molecular weight of less than 10,000, 000 g/mol can in principle be selected arbitrarily within the scope of the present invention. It has however proved to be extremely favourable for the self-crosslinking polyvinyl acetal and the polyvinyl acetal with a weight mean of the molecular weight of less than 1,000,000 g/mol to be present in a weight ratio in the range from 1:10 to 10:1, preferably in a weight ratio in the range from 1:5 to 5:1, expediently in a weight ratio in the range from 1:1 to 1:10, in particular in a weight ratio in the range from 1:1 to 1:5.

The following examples and comparative examples serve to explain the invention, without any restriction of the inventive idea thereby arising.

A. Methods of Determination

A.1 Determination of the Content of Vinyl Acetate Units of Polyvinyl Acetals

The polyvinyl acetal was dissolved in a benzyl alcohol/ethanol mixture. The acetate groups were saponified with an excess of alcoholic caustic potash solution. The excess caustic potash solution was titrated back with hydrochloric acid. The content of vinyl acetate units was calculated on the basis of the hydrochloric acid consumption.

A.2 Determination of the Dynamic Viscosity of a Solution of Polyvinyl Alcohol 96.00±0.01 g of distilled water and 4.00±0.01 g of polyvinyl alcohol were weighed into a 250 ml Erlenmeyer flask with a ground-in stopper and completely dissolved at 50° C. in the mechanical shaker. Cooling was then carried out to 20° C. and the dynamic viscosity (DIN 53015: Method according to Höppler) was determined a 20° C. with ball 3.

A.3 Determination of the Content of Acetyl Groups of Polyvinyl Alcohol

Analogous to method of determination A. 1, an alkaline ester hydrolysis was carried out with a potassium hydroxide excess and then back-titration was carried out with hydrochloric acid. A difference exists solely in the performance of the overall analysis in the aqueous medium, since the polyvinyl alcohol used as an educt is water-soluble.

A.4 Melt Index

Before measurement of the melt index, the films were conditioned for 24 h at 23° C. and with a relative air humidity of 50%. The measurement of the films took place with a melt-index testing device (manufacturer Göttfert, type: MP-D) at 190° C. with a load of 2.16 kg using a 2 mm die according to ISO 1133.

A.5 Pummel Test

The test-pieces were produced as follows: the films were conditioned in a climate of 23° C./30% relative air humidity for 24 h. The laying in place took place on 2 mm float glass in a fire/tin orientation of the film to the glass surface. Before the laying in place, the glass was washed with demineralised water. The production of the laminated glass panes took place by pressing the composites in the pre-lamination furnace with calender rollers at temperatures between 40° C. and 100° C., followed by pressing of the composites in an autoclave at a pressure of 12 bar and a temperature of 1400 for 30 min.

Test-pieces measuring 10×30 cm were cut from the laminated glasses in order to perform the pummel test. The performance of the test took place according to DE 10100681. The adhesion of the film to the fire-side of the glass was evaluated.

A.6 Molecular Weight Mw

The determination of the molecular weights Mw (=weight mean) of the polyvinyl butyrals took place by means of gel permeation chromatography (GPC) in pure acetic acid using RI detectors. The calibration of the detectors was carried out by means of a PVB calibration standard, the absolute values of which were determined by means of static light scatter.

B EXAMPLES

Use was made of the following as polymer raw materials (content data in mol. %; viscosity data for 4 wt. % aqueous solutions according to DIN 53015):

polymer A: 4.0% acetyl, 2.1% itaconic acid, 93.9% vinyl alcohol; viscosity 30.9 mPas polymer B: 1.8% acetyl, 3.9% maleic acid, 94.3% vinyl alcohol; viscosity 12.7 mPas polymer C: 1.6% acetyl, 98.4% vinyl alcohol; viscosity 11.0 mPas polymer D: 2.5% acetyl, 0.9% itaconic acid, 96.6% vinyl alcohol; viscosity 31.3 mPas polymer E: 0.6% acetyl, 99.4% vinyl alcohol; viscosity 30.0 mPas Example 1

2008 g of distilled water and 5192 g of an aqueous solution containing 10.40 wt. % of carboxyl group-modified polyvinyl alcohol were first put in a 10 l glass reactor. It involved a 75:25 mixture of polymers A and B, which had a viscosity according to Höppler of 26.1 mPas (measured as a 4 wt. % aqueous solution according to DIN 53015). Heating was carried out whilst stirring until 90° C. internal temperature was reached and then cooling was carried out. 308.9 g of butyraldehyde was slowly added at 35° C., whereby the temperature fell by a further 5° C. 78 ml of 20 wt. % hydrochloric acid was added drop by drop within 15 minutes at 14° C. The product was precipitated from the reaction solution as a colourless deposit 53 minutes after completion of the metered addition of hydrochloric acid. Directly thereafter, 374 ml of 20 wt. % hydrochloric acid was again added within 15 minutes. The suspension was then heated to 65° C. within 90 minutes and held for 1 hour at this temperature with continued stirring. Finally, the polymer was drawn off by suction, washed with distilled water until a neutral reaction of the filtrate and dried in a vacuum at 40° C. The obtained polyvinyl acetal had a content of 6.3 wt. % of vinyl acetate units.

Example 2

2052 g of distilled water and 5148 g of an aqueous solution containing 10.49 wt. % of carboxyl group-modified polyvinyl alcohol were first put in a 10 l glass reactor. It involved an 80:20 mixture of polymers A and C, which had a viscosity according to Höppler of 26.2 mPas (measured as a 4 wt. % aqueous solution according to DIN 53015). Heating was carried out whilst stirring until 90° C. internal temperature was reached and then cooling was carried out. 308.9 g of butyraldehyde was slowly added at 35° C., whereby the temperature fell by a further 5° C. 78 ml of 20 wt. % hydrochloric acid was added drop by drop within 15 minutes at 14° C. The product was precipitated from the reaction solution as a colourless deposit 27 minutes after completion of the metered addition of hydrochloric acid.

After a further 18 minutes, 374 ml of 20 wt. % hydrochloric acid was again added within 15 minutes. The suspension was then heated to 65° C. within 90 minutes and held for 1 hour at this temperature with continued stirring. The polymer was then drawn off by suction, washed with distilled water until a neutral reaction of the filtrate and dried in a vacuum at 40° C. The obtained polyvinyl acetal had a content of 5.1 wt. % of vinyl acetate units.

Example 3

1911 g of distilled water and 5289 g of an aqueous solution containing 10.21 wt. % of carboxyl group-modified polyvinyl alcohol were first put in a 10 l glass reactor. It involved an 80:20 mixture of polymers D and C, which had a viscosity according to Höppler of 26.2 mPas (measured as a 4% aqueous solution according to DIN 53015). Heating was carried out whilst stirring until 90° C. internal temperature was reached and then cooling was carried out. 308.9 g of butyraldehyde was slowly added at 35° C., whereby the temperature fell by a further 5° C. 78 ml of 20 wt. % hydrochloric acid was added drop by drop within 15 minutes at 14° C. The product was precipitated from the reaction solution as a colourless deposit 32 minutes after completion of the metered addition of hydrochloric acid. After a further 13 minutes, 374 ml of 20 wt. % hydrochloric acid was again added within 15 minutes. The suspension was then heated to 65° C. within 90 minutes and held for 1 hour at this temperature with continued stirring. The polymer was then drawn off by suction, washed with distilled water until a neutral reaction of the filtrate and dried in a vacuum at 40° C. The obtained polyvinyl acetal had a content of 3.8 wt. % of vinyl acetate units.

Example 4

1927 g of distilled water and 5273 g of an aqueous solution containing 10.24 wt. % of carboxyl group-modified polyvinyl alcohol were first put in a 10 l glass reactor. It involved an 58:42 mixture of polymers B and E, which had a viscosity according to Höppler of 26.0 mPas (measured as a 4 wt. % aqueous solution according to DIN 53015). Heating was carried out whilst stirring until 90° C. internal temperature was reached and then cooling was carried out. 308.9 g of butyraldehyde was slowly added at 35° C., whereby the temperature fell by a further 5° C. 78 ml of 20 wt. % hydrochloric acid was added drop by drop within 15 minutes at 14° C. The product was precipitated from the reaction solution as a colourless deposit 53 minutes after completion of the metered addition of hydrochloric add. Directly thereafter, 374 ml of 20 wt. % hydrochloric acid was again added within 15 minutes. The suspension was then heated to 65° C. within 90 minutes and held for 1 hour at this temperature with continued stirring. Finally, the polymer was drawn off by suction, washed with distilled water until a neutral reaction of the filtrate and dried in a vacuum at 40° C. The obtained polyvinyl acetal had a content of 5.8 wt. % of vinyl acetate units.

Comparative Example 5

4058 g of distilled water and 4239 g of an aqueous solution containing 14.68 wt. % of polyvinyl alcohol were first put in a 10 l glass reactor. The polyvinyl alcohol used had an acetyl content of 0.8 mol %, a vinyl alcohol content of 99.2 mol % and a viscosity according to Höppler of 26.5 mPas (measured as a 4 wt. % aqueous solution according to DIN 53015). Heating was then carried out whilst stirring until 90° C. internal temperature was reached and then cooling was carried out. 355.9 g of butyraldehyde was slowly added at 35° C., whereby the temperature fell by a further 5° C. 90 ml of 20 wt. % hydrochloric acid was added drop by drop within 15 minutes at 14° C. The product was precipitated from the reaction solution as a colourless deposit 7 minutes after completion of the metered addition of hydrochloric acid. After a further 38 minutes, 431 ml of 20 wt. % hydrochloric acid was again added within 15 minutes. The suspension was then heated to 65° C. within 90 minutes and held for 1 hour at this temperature with continued stirring. The polymer was then drawn off by suction, washed with distilled water until a neutral reaction of the filtrate and dried in a vacuum at 40° C. The obtained polyvinyl acetal had a content of 1.1 wt. % of vinyl acetate units.

Comparative example 6 and examples 7-14 show the use of the polyvinyl acetals according to the invention in films for laminated safety glass.

Comparative Example 6

296 g of PVB according to comparative example 5, 104 g of triethyleneglycol-di-n-heptane acid ester (3G7) and 0.75 g of Tinuvin P were extruded into a film. Prior to the extrusion, the polyvinyl acetal was mixed with a plasticiser in a laboratory mixer (manufacturer: Brabender, model 826801). Before the mixture was prepared, the UV stabiliser Tinuvin® P (manufacturer: Ciba Specialty Chemicals) was dissolved in the plasticiser. Flat film with a thickness of 0.8 mm was extruded from the PVB/plasticiser mixture. The extrusion took place on a twin-screw extruder with contra-rotating screws (manufacturer: Haake, System Rheocord 90), equipped with melt pump and slot die. The adjustment of the heating zones of the extruder was as follows:

Zone 1-3 (cylinder): 240° C.
Melt pump: 220° C.
Die: 150° C.

Examples 7-10 illustrate the molecular weight build-up during the extrusion, recognisable by the marked increase in the melt viscosity.

Examples 7-10

Procedure analogous to comparative example 6. Polyvinyl acetals according to examples 1-4 were used. On account of the marked molecular-weight build-up and—resulting therefrom—the excessively high viscosity of the melt, the extrusion had to be discontinued after a short time in examples 7-10, so that no usable film was obtained.

In examples 11-14, the PVB types according to examples 1-4 were therefore mixed with PVB according to comparative example 5, in order thereby to reduce the degree of crosslinking and to facilitate the extrusion. The molecular weights of the mixtures were determined by means of GPC before and after extrusion. The molecular weight build-up can be recognised by the increasing molecular weights Mw of the polymers as well as the low values of the MFR 190. The results are according to table 1.

Example 11

236.8 g of PVB according to comparative example 5 and 59.2 of PVB according to example 1 were used. Other formulation constituents and performance are as comparative example 6.

Example 12

236.8 g of PVB according to comparative example 5 and 59.2 of PVB according to example 2 were used. Other formulation constituents and performance are as comparative example 6.

Example 13

236.8 g of PVB according to comparative example 5 and 59.2 of PVB according to example 3 were used. Other formulation constituents and performance are as comparative example 6.

Example 14

236.8 g of PVB according to comparative example 5 and 59.2 of PVB according to example 4 were used. Other formulation constituents and performance are as comparative example 6.

TABLE 1

Results of film test

| | Comparative example 6 | Example 11 | Example 12 | Example 13 | Example 14 |
|---|---|---|---|---|---|
| Mw PVB, before extrusion (g/mol) | 107850 | 106150 | 104750 | 110350 | 102250 |
| Mw PVB, after extrusion (g/mol) | 104450 | 128800 | 125300 | 121200 | 119900 |
| MFR 190 (g/mol) | 2.36 | Not measurable | 0.54 | 0.74 | 0.92 |
| Pummel fire-side | 9 | 9 | 9 | 9 | 9 |

Example 15 and comparative example 16 show the use of the polyvinyl acetals according to the invention in coatings.

Example 15

12 g of PVB's from example 1 was dissolved in a solvent mixture consisting of 66.7 g of ethanol, 38.2 g of n-butanol, 16.6 g of 3-methoxybutanol and 16.6 g of ethylene glycol. The solution was deposited with a wet layer thickness of 200 μm on a test sheet of aluminium and pre-dried in air at room temperature. The test sheet was then baked at 180° C. for 15 min. The resulting dry layer thickness, measured with the Minitest 600 FN2 from the firm Erichsen GmbH & Co. KG, gave a mean value of 4.8 μm.

Comparative Example 16

12 g of PVB's from comparative example 1 was dissolved in the solvent mixture of example 5 and also deposited with a wet layer thickness of 200 μm on a test sheet of aluminium. Pre-drying and baking were carried out analogous to example 15. The method for measuring the dry layer thickness described in example 15 gave a value of 3.4 μm.

In order to test the coatings from example 15 and comparative example 16, use was made of the ethanol abrasion test and the acetone abrasion test. For this purpose, a cotton cloth was saturated with ethanol and acetone respectively and rubbed over the baked coating. Table 2 shows the number of double strokes that were used in order to rub through the coating. Higher numerical values in this test verify that the coating from example 15 is attacked by ethanol and acetone much more slowly than the coating of comparative example 16, i.e. that the former is strongly crosslinked. This result is additionally supported by the fact that the dry layer thickness of the coating from example 15 was less than that from comparative example 16 and, therefore, would theoretically have been bound to be rubbed through sooner.

TABLE 2

Results of abrasion test

| | Example 15 | Comparative example 16 |
|---|---|---|
| Number of double strokes in acetone abrasion test | >100 | 30 |
| Number of double strokes in ethanol abrasion test | >100 | 15 |

What is claimed is:

1. A crosslinked polyvinyl acetal, characterized in that it can be obtained from at least one polyvinyl acetal (I), which can be obtained by reacting at least one polymer (A), which contains a) 1.0 to 99.9 wt. % structural units of formula (1)

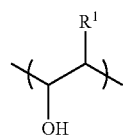

(1)

wherein $R^1$ denotes hydrogen or methyl, b) 0 to 99.0 wt. % structural units of formula (2)

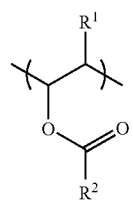

(2)

wherein $R^2$ represents hydrogen or an alkyl radical with 1 to 6 carbon atoms, c) 0 to 70.0 wt. % structural units of formula (3)

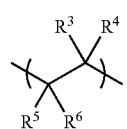

(3)

wherein $R^3$, $R^4$, $R^5$ and $R^6$ are, in each case independently of one another, radicals with a molecular weight in the range from 1 to 500 g/mol, d) 0.0001 to 30.0 wt. % structural units of formula (4)

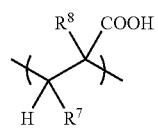

(4)

wherein $R^7$ and $R^8$ represent, in each case independently of one another, hydrogen, a carboxyl group or an alkyl group with 1 to 10 carbon atoms, which can optionally have one or more COOH groups as substituents, related in each case to the total weight of polymer (A), with at least one compound (B) of formula (5),

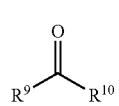

(5)

wherein $R^9$ and $R^{10}$ are, in each case independently of one another, hydrogen, COOH, an alkyl group with 1 to 10 carbon atoms or an optionally substituted aryl group with 6 to 12 carbon atoms, whereby groups of formula (1) and of formula (4) are, at least in part, esterified with one another wherein the polyvinyl acetal is thermally crosslinked at temperatures in the range from 120° C. to 280° C.

2. The polyvinyl acetal according to claim 1, characterized in that its total content of esterified and non-esterified carboxyl groups lies in the range from 0.001 to 10.0 wt. %, related to the total weight of the polyvinyl acetal.

3. The polyvinyl acetal according to claim 2, characterized in that its total content of esterified and non-esterified carboxyl groups lies in the range from 0.01 to 5.0 wt. %, related to the total weight of the polyvinyl acetal.

4. The polyvinyl acetal according to claim 3, characterized in that its total content of esterified and non-esterified carboxyl groups lies in the range from 0.01 to 2.0 wt. %, related to the total weight of the polyvinyl acetal.

5. The polyvinyl acetal according to claim 1, characterized in that it contains plasticiser.

6. The polyvinyl acetal according to claim 1, characterized in that the polyvinyl acetal (I) is thermally crosslinked together with at least one plasticizer at temperatures in the range from 120° C. to 280° C.

7. The polyvinyl acetal according to claim 6, characterized in that the thermal crosslinking is carried out in an extruder, a kneading unit or another heatable unit.

8. A molding compound containing a polyvinyl acetal according to claim 1.

9. The molding compound according to claim 8 further containing a polyvinyl acetal with a weight mean of the molecular weight of less that 1,000,000 g/mol.

10. The molding compound according to claim 9, characterized in that the polyvinyl acetal with a weight mean of the molecular weight of less than 10,000,000 g/mol can be obtained by reacting at least one polymer (A'), which contains a) 1.0 to 99.9 wt. % structural units of formula (1)

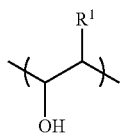

(1)

wherein $R^1$ denotes hydrogen or methyl, b) 0 to 99.0 wt. % structural units of formula (2)

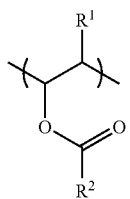

(2)

wherein $R^2$ represents hydrogen or an alkyl radical with 1 to 6 carbon atoms, c) 0 to 70.0 wt. % structural units of formula (3)

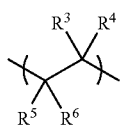

(3)

wherein $R^3$, $R^4$, $R^5$ and $R^6$ are, in each case independently of one another, radicals with a molecular weight in the range from 1 to 500 g/mol, d) less than 0.1 wt. % structural units of formula (4)

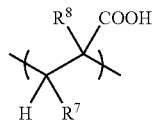

(4)

wherein $R^7$ and $R^8$ represent, in each case independently of one another, hydrogen, a carboxyl group or an alkyl group with 1 to 10 carbon atoms, which can optionally have one or more COOH groups as substituents, related in each case to the total weight of polymer (A'), with at least one compound (B') of formula (5),

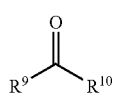

(5)

wherein $R^9$ and $R^{10}$ are, in each case independently of one another, hydrogen, COOH, an alkyl group with 1 to 10 carbon atoms or an optionally substituted aryl group with 6 to 12 carbon atoms, whereby groups of formula (1) and of formula (4) are, at least in part, esterified with one another.

11. The molding compound according to claim 9, characterized in that the crosslinked polyvinyl acetal and the polyvinyl acetal with a weight mean of the molecular weight of less that 10,000,000 g/mol are present in a weight ratio in the range from 1:10 to 10:1.

12. A film containing a molding compound according to claim 8.

13. Laminated safety glasses comprising a film according to claim 12.

14. A coating containing a molding compound according to claim 8.

15. An ion-conductive interlayer in an electrochromic system comprising a molding compound according to claim 8.

16. A crosslinked polyvinyl acetal, characterized in that it can be obtained from at least one polyvinyl acetal (I), which can be obtained by reacting at least one polymer (A), which contains a) 1.0 to 99.9 wt. % structural units of formula (1)

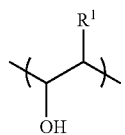

(1)

wherein $R^1$ denotes hydrogen or methyl, b) 0 to 99.0 wt. % structural units of formula (2)

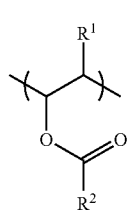

(2)

wherein $R^2$ represents hydrogen or an alkyl radical with 1 to 6 carbon atoms, c) 0 to 70.0 wt. % structural units of formula (3)

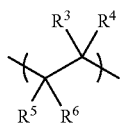
(3)

wherein $R^3$, $R^4$, $R^5$ and $R^6$ are, in each case independently of one another, radicals with a molecular weight in the range from 1 to 500 g/mol, d) 0.0001 to 30.0 wt. % structural units of formula (4)

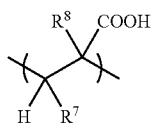
(4)

wherein $R^7$ and $R^8$ represent, in each case independently of one another, hydrogen, a carboxyl group or an alkyl group with 1 to 10 carbon atoms, which can optionally have one or more COOH groups as substituents, related in each case to the total weight of polymer (A), with at least one compound (B) of formula (5),

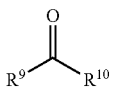
(5)

wherein $R^9$ and $R^{10}$ are, in each case independently of one another, hydrogen, COOH, an alkyl group with 1 to 10 carbon atoms or an optionally substituted aryl group with 6 to 12 carbon atoms, whereby groups of formula (1) and of formula (4) are, at least in part, esterified with one another; and wherein at least 10 mol % of all carboxyl groups in the polyvinyl acetal are esterified.

17. The crosslinked polyvinyl acetal polymer of claim 16 wherein at least 20 mol % of all carboxyl groups in the polyvinyl acetal are esterified.

* * * * *